United States Patent
Shi

(10) Patent No.: US 9,272,839 B2
(45) Date of Patent: Mar. 1, 2016

(54) GLASS PANEL PACKAGING BOX AND DE-PACKAGING METHOD THEREOF

(71) Applicant: Shenzhen China Star Optoelectronics Technology Co., Ltd., Shenzhen, Guangdong (CN)

(72) Inventor: Qinjun Shi, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 129 days.

(21) Appl. No.: 14/349,161

(22) PCT Filed: Jun. 26, 2013

(86) PCT No.: PCT/CN2013/078065
§ 371 (c)(1),
(2) Date: Apr. 2, 2014

(87) PCT Pub. No.: WO2014/180040
PCT Pub. Date: Nov. 13, 2014

(65) Prior Publication Data
US 2015/0329278 A1    Nov. 19, 2015

(30) Foreign Application Priority Data

May 6, 2013  (CN) .......................... 2013 1 0163312

(51) Int. Cl.
| | | |
|---|---|---|
| *B65D 85/38* | (2006.01) | |
| *B65D 85/62* | (2006.01) | |
| *B65D 57/00* | (2006.01) | |
| *B65D 81/05* | (2006.01) | |
| *B65B 69/00* | (2006.01) | |
| *B65H 3/08* | (2006.01) | |
| *B65D 85/48* | (2006.01) | |

(52) U.S. Cl.
CPC ............ *B65D 85/38* (2013.01); *B65B 69/0025* (2013.01); *B65D 81/051* (2013.01); *B65D 85/48* (2013.01); *B65H 3/0816* (2013.01); *B65D 57/00* (2013.01); *B65D 85/62* (2013.01); *B65H 2301/152* (2013.01); *B65H 2405/50* (2013.01); *B65H 2701/17* (2013.01)

(58) Field of Classification Search
None
See application file for complete search history.

(56) References Cited

U.S. PATENT DOCUMENTS

| | | | | |
|---|---|---|---|---|
| 4,466,754 A | * | 8/1984 | Poitier ............... | B60H 1/00528 |
| | | | | 403/11 |
| 6,889,609 B2 | * | 5/2005 | Braun ..................... | B41F 23/06 |
| | | | | 101/424.1 |

(Continued)

FOREIGN PATENT DOCUMENTS

| | | |
|---|---|---|
| CN | 101857151 A | 10/2010 |
| CN | 201703702 U | 1/2011 |
| CN | 102717982 A | 10/2012 |

(Continued)

*Primary Examiner* — Kavel Singh
(74) *Attorney, Agent, or Firm* — Andrew C. Cheng

(57) ABSTRACT

Disclosed are a glass panel packaging box and a de-packaging method thereof. The glass panel packaging box includes a box body and a cushioning separator plate arranged in the box body. The cushioning separator plate is arranged between two glass panels. The cushioning separator plate includes a main body corresponding to the glass panels and lugs respectively extending from two opposite side edges of the main body. The box body includes a bottom board and side boards perpendicularly connected to the bottom board. The side boards include receiving slots that correspond to the lugs. The glass panel packaging box and the de-packaging method thereof provide lugs on the cushioning separator plate to make separation of the cushioning separator plate and the glass panel easy so as to increase working efficiency and allow reduction of the thickness of the cushioning separator plate used with a large-sized glass panel.

10 Claims, 10 Drawing Sheets

(56) References Cited

U.S. PATENT DOCUMENTS

| | | | | |
|---|---|---|---|---|
| 8,474,618 B2* | 7/2013 | McDowell | ............ | B65D 85/48 206/448 |
| 2008/0156679 A1* | 7/2008 | Bonora | ............ | B65D 81/2076 206/320 |

FOREIGN PATENT DOCUMENTS

| | | |
|---|---|---|
| CN | 202575045 | 12/2012 |
| CN | 102897436 A | 1/2013 |
| KR | 20100078836 A | 7/2010 |
| KR | 20110071580 A | 6/2011 |

* cited by examiner

| | |
|---|---|
| 11 | providing a glass panel packaging box that contains therein glass panels, a vacuum suction cup, and an ionic fan, wherein the glass panel packaging box comprises a box body and a plurality of cushioning separator plates arranged in the box body, the glass panels being received in the box body in such a way that the cushioning separator plates are each arranged between two of the glass panels, the cushioning separator plates each comprising a main body corresponding to the glass panels and lugs respectively extending from two opposite side edges of the main body, the box body comprising a bottom board and side boards perpendicularly connected to the bottom board, the side boards comprising receiving slots that correspond to the lugs |
| 12 | using the vacuum suction cup to suck and hold and lift upward the glass panels |
| 13 | using the ionic fan to blow airflows to contact areas between the glass panel that is being retrieved and the lugs of the cushioning separator plate in order to break vacuum between the glass panel and the cushioning separator plate to allow the cushioning separator plate to separate and retain in the box body |
| 14 | removing the cushioning separator plate that is so separated and retained in the box body in order to expose a lower one of the glass panels |
| 15 | repeating steps (12) to (14) until the glass panels contained in the box body are all retrieved |

Fig. 7

GLASS PANEL PACKAGING BOX AND DE-PACKAGING METHOD THEREOF

BACKGROUND OF THE INVENTION

1. Field of the Invention

The present invention relates to the field of packaging, and in particular to a glass panel packaging box and a de-packaging method thereof.

2. The Related Arts

Liquid crystal displays (LCDs) have a variety of advantages, such as thin device body, low power consumption, and being free of radiation, and are thus widely used. Most of the LCDs that are currently available in the market are backlighting LCDs, which comprise an enclosure, a liquid crystal panel received in the enclosure, and a backlight module arranged in the enclosure. The operation principle of the liquid crystal panel is that with liquid crystal molecules interposed between two parallel glass substrates, application of electricity is selectively carried out to control the liquid crystal molecules to change direction in order to refract out light emitting from the backlight module for generating images.

The liquid crystal panel comprises a thin-film transistor (TFT) substrate, a color filter (CF) substrate that is opposite to the TFT substrate, and a liquid crystal layer interposed between the TFT substrate and the CF substrate. In a manufacturing process of the TFT substrate and the CF substrate, a packaging box is used to transport glass panels and de-packaging is carried out on the entire box of glass panels once they are transported to an associated working station.

Referring to FIG. 1, a schematic view of conventional packaging of glass panel is shown. Glass panels 100 are sequentially stacked in a packaging box 300. Between the glass panels 100, rigid or flexible materials are provided to serve as cushioning separator plates 500 that separate adjacent ones of glass panels 100 for the purposes of avoiding the formation of vacuum between stacked glass panels 100 that makes the retrieval of individual panel difficult. Commonly used cushioning separation plates 500 are of a shape and size corresponding to the glass panels 100 and also have the same. However, to de-package and retrieve the glass panels after the glass panels 100 have been packaged and shipped to a client site or have been stored for a period of time, since vacuum can be easily formed between the glass panels 100 and the cushioning separator plates 500, it is still possible that the panels get stuck due to vacuum. When suction cups 700 are used to retrieve a glass panel 100, the glass panel 100 that is sucked and held may get sticking to the separator plate 500 on the under side. If the cushioning separator plate 500 is further stuck to the glass panel 100 in contact with an underside thereof (as shown in FIG. 2), then the glass panel 100 that is stuck to the underside of the cushioning separator plate 500 may also be raised and will fall during transportation by the suction cups 700 (as shown in FIG. 3) and get broken, thereby heightening the manufacture cost.

To alleviate the above discussed situation of panel sticking, a conventional solution is to increase the thickness of the separator plate. The larger the size of the glass panel is, the greater the thickness of the cushioning separator plate will be, in order to avoid as much as possible the glass panel and the cushioning separator plates being stuck to each other due to vacuum formed therebetween. Such a solution, however, will increase the weight of the packaging material and heighten the expense of the packaging material, and will also reduce the number of glass panels packaged so as to result in an increase of transportation expense.

SUMMARY OF THE INVENTION

An object of the present invention is to provide a glass panel packaging box, wherein lugs are provided on a cushioning separator plate in order to make the cushioning separator plate easily detach from a glass panel in de-packaging the glass plane packaging box and enhance the operation efficiency and allow reduction of the cushioning separator plate for use with a large-sized glass panel thereby reducing the weight of the packaging material, lowering down the expense of the packaging material, and effectively suppressing the occurrence of breaking of the glass panel.

Another object of the present invention is to provide a method for de-packaging a glass panel packaging box, which arranges lugs on a cushioning separator plate and blows airflows from the lugs of the cushioning separator plate toward the contact areas between the glass panel and the cushioning separator plate to break vacuum between the glass panel and the cushioning separator, making separation of the cushioning separator plate and the glass panel easy, effectively increasing working efficiency, and reducing the thickness of the cushioning separator plate used with a large-sized glass panel thereby reducing the weight of the packaging material, lowering down the expense of the packaging material, and reducing the occurrence of breaking glass panels.

A further object of the present invention is to provide a method for de-packaging a glass panel packaging box, which arranges lugs on a cushioning separator plate and provides an ancillary clip to constrain movement of the lugs of the cushioning separator plate, making separation of the cushioning separator plate and the glass panel easy, effectively increasing working efficiency, and reducing the thickness of the cushioning separator plate used with a large-sized glass panel thereby reducing the weight of the packaging material, lowering down the expense of the packaging material, and reducing the occurrence of breaking glass panels.

To achieve the above object, the present invention provides a glass panel packaging box, which comprises: a box body and a cushioning separator plate arranged in the box body. The cushioning separator plate is arranged between two glass panels. The cushioning separator plate comprises a main body corresponding to the glass panels and lugs respectively extending from two opposite side edges of the main body. The box body comprises a bottom board and side boards perpendicularly connected to the bottom board. The side boards comprise receiving slots that correspond to the lugs.

Each of the lugs comprises an opening formed therein.

The main body is in the form of a rectangle.

The cushioning separator plate further comprises projecting tabs extending from another two opposite side edges of the main body. The side boards comprise accommodation slots corresponding to the projecting tabs.

The present invention further comprise a method for de-packaging a glass panel packaging box, which comprises the following steps:

(1) providing a glass panel packaging box that contains therein glass panels, a suction cup, and a fan, wherein the glass panel packaging box comprises a box body and a plurality of cushioning separator plates arranged in the box body, the glass panels being received in the box body in such a way that the cushioning separator plates are each arranged between two of the glass panels, the cushioning separator plates each comprising a main body corresponding to the glass panels and lugs respectively extending from two opposite side edges of the main body, the box body comprising a bottom board and side boards perpendicularly connected to the bottom board, the side boards comprising receiving slots that correspond to the lugs;

(2) using the suction cup to suck and hold and lift upward one of the glass panels;

(3) using the fan to blow airflows to contact areas between the glass panel that is being retrieved and the lugs of the cushioning separator plate in order to break vacuum between the glass panel and the cushioning separator plate to allow the cushioning separator plate to separate and retain in the box body;

(4) removing the cushioning separator plate that is so separated and retained in the box body in order to expose a lower one of the glass panels; and (5) repeating steps (2) to (4) until the glass panels contained in the box body are all retrieved.'

The fan comprises an ionic fan and in step (4), a suction cup is used to remove the cushioning separator plate, the suction cup being a vacuum suction cup.

The present invention further provides a method for de-packaging a glass panel packaging box, which comprises the following steps:

(1) providing a glass panel packaging box that contains therein glass panels and a suction cup, wherein the glass panel packaging box comprises a box body and a plurality of cushioning separator plates arranged in the box body, the glass panels being received in the box body in such a way that the cushioning separator plates are each arranged between two of the glass panels, the cushioning separator plates each comprising a main body corresponding to the glass panels and lugs respectively extending from two opposite side edges of the main body, the box body comprising a bottom board and side boards perpendicularly connected to the bottom board, the side boards comprising receiving slots that correspond to the lugs;

(2) constraining the lugs from moving upward with the glass panels;

(3) using the suction cup to suck and hold and lift upward one of the glass panels, wherein the lugs are constrained from moving upwards with the glass panel, the cushioning separator plate is separated from the glass panel at the time when the glass panel is lifted and thus kept in the box body;

(4) releasing the constraint of the lugs and removing the cushioning separator plate to expose a lower glass panel; and (5) repeating steps (2) to (4) until the glass panels are all retrieved.

In step (1), each of the lugs comprises an opening formed therein; in step (2), a retention hook is inserted through the opening to retain the lug so as to constrain the lug from moving upward with the glass panel; and in step (3), the retention hook is moved to release the constraint of the lug.

In step (2), the retention hook comprises an ancillary clip. The ancillary clip comprises a base section and a hook section connected to the base section. The base section comprises a horizontal support portion and a connection portion extending upward from the support portion. The hook section comprises a horizontal constraint portion connected to the connection portion and a positioning portion connected to the constraint portion and extending downward. The positioning portion is insertable into the opening of the lug. The constraint portion functions to prevent the lug from moving upward with the glass panel. The retention hook that is formed of the constraint portion and the positioning portion is mounted and fixed by means of the base section.

Step (3) further comprises using a fan to blow airflows to contact areas between the glass panel that is being retrieved and the lugs of the cushioning separator plate in order to break vacuum between the glass panel and the cushioning separator plate to allow the cushioning separator plate to separate and retain in the box body.

The efficacy of the present invention is that the present invention provides a glass panel packaging box and a de-packaging method thereof, wherein lugs are provided on a cushioning separator plate and in de-packaging a glass panel packaging box, ionic fans are used to blow airflows from the locations of the lugs of the cushioning separator plate toward contact area between a glass panel and the cushioning separator plate in such a way that the airflows move in between the glass panel and the cushioning separator plate via the lugs to break vacuum between the glass panel and the cushioning separator plate to make separation of the cushioning separator plate and the glass panel easy so as to increase working efficiency and effectively reduces the occurrence of breaking of glass panels. Further, it is feasible to form an opening in each of the lugs to allow an ancillary clip to extend through the lugs to retain the cushioning separator plates in the box body for further improving the working efficiency, whereby the cushioning separator plates used with large-sized glass panels can be of a reduced thickness to reduce the weight of the packaging material, lower down the expense of the packaging material, and reduce the occurrence of breaking glass panel resulting from vacuum suction between the glass panels and the cushioning separator plates.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing:

FIG. 7 is a flow chart illustrating a method for de-packaging a glass panel packaging box according to a first embodiment of the present invention;

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
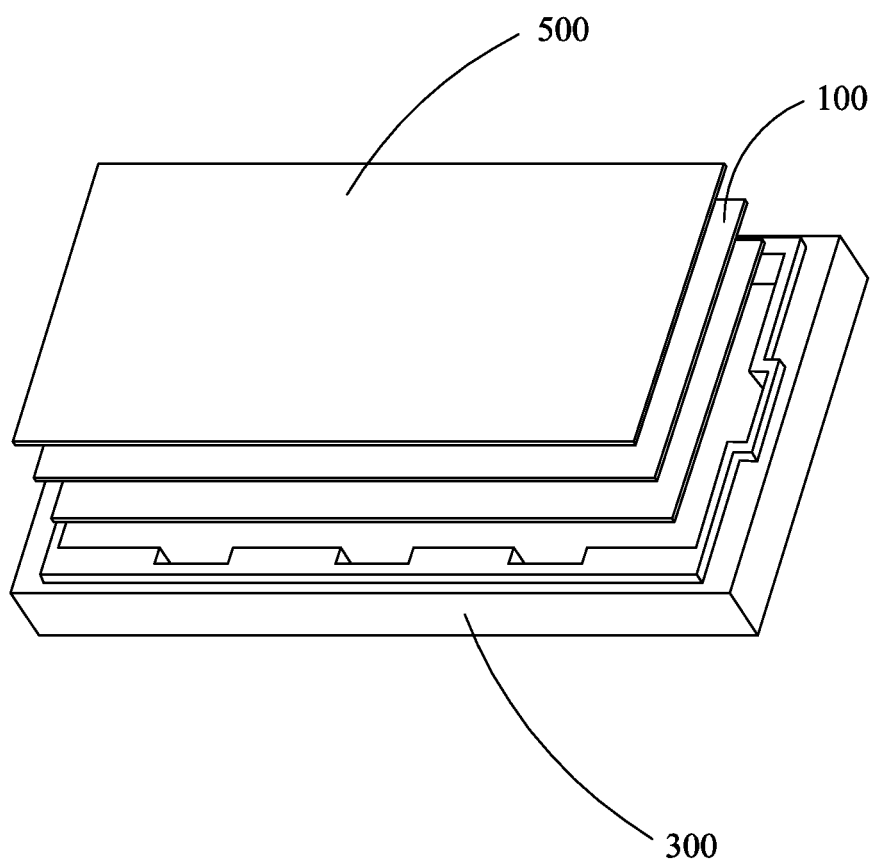
FIG. 1 is a schematic perspective view showing a conventional glass panel packaging box.
Figure 2:
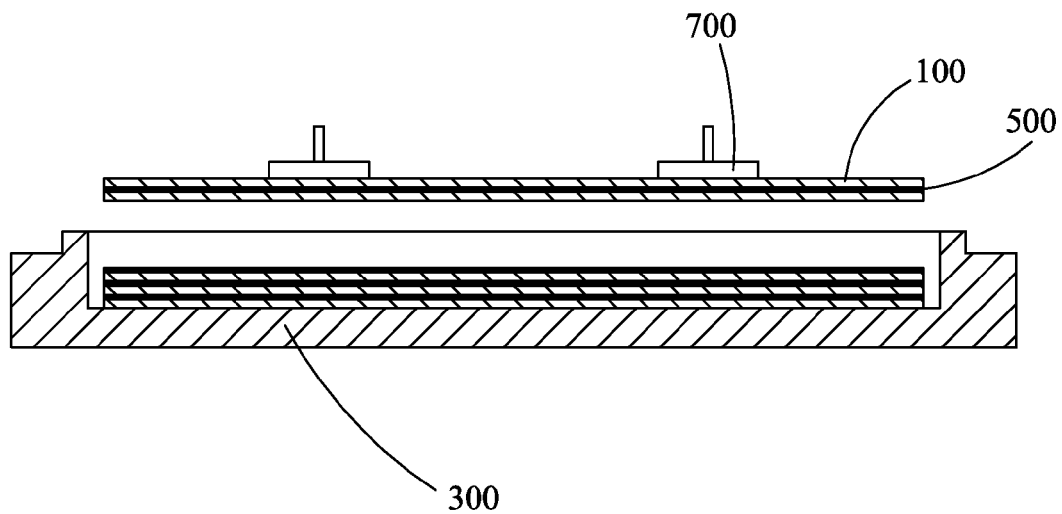
FIG. 2 is a schematic view illustrating vacuum suction between a glass panel and a cushioning separator plate in retrieving the glass panel for glass panels packaged in the conventional packaging box.
Figure 3:
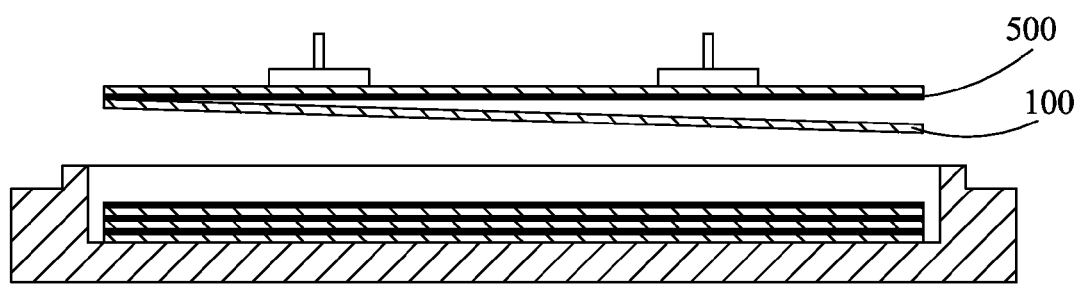
FIG. 3 is a schematic view illustrating falling of a glass panel in retrieving a glass panel for glass panels packaged in the conventional packaging box.
Figure 4:
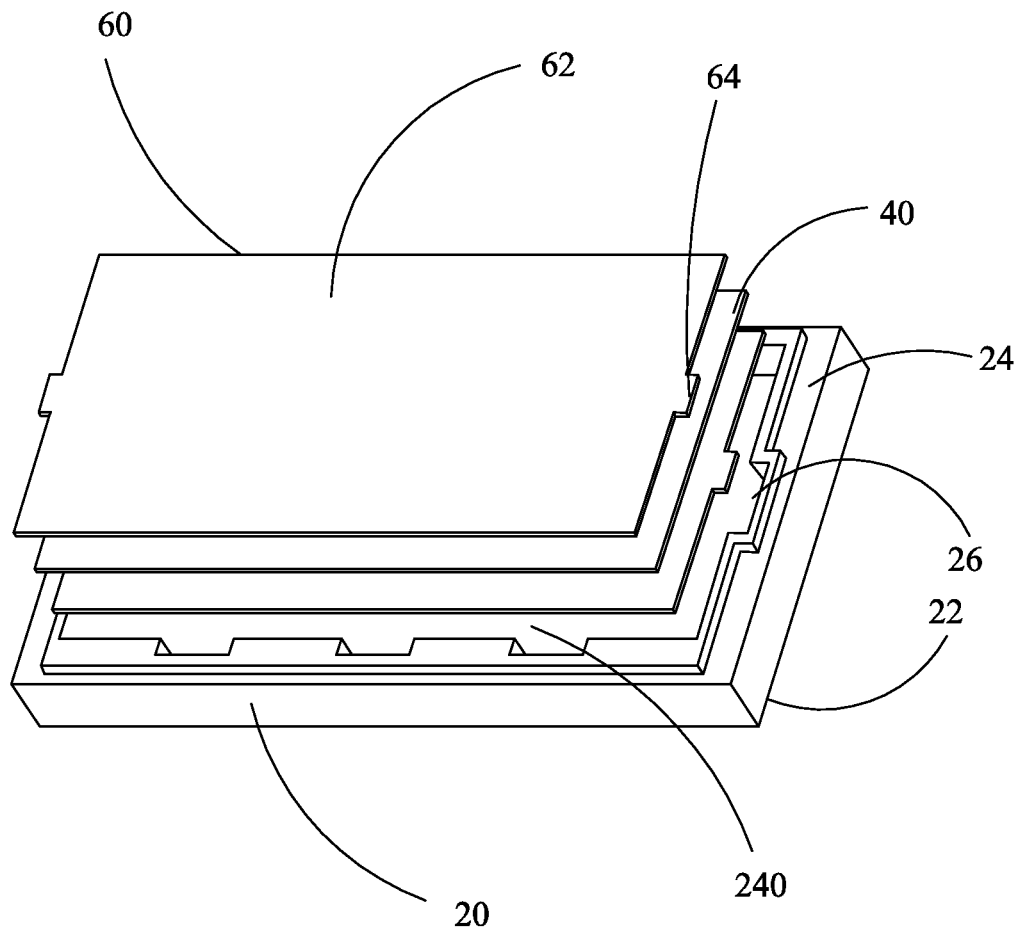
FIG. 4 is a schematic view showing a glass panel packaging box according to a first embodiment of the present invention.

Referring to FIG. 4, the present invention provides a glass panel packaging box, which comprises: a box body 20 and cushioning separator plates 60 arranged in the box body 20. The cushioning separator plates 60 are each arranged between two glass panels 40. The cushioning separator plates 60 each comprise a main body 62 corresponding to a glass panel 40 and lugs 64 respectively extending from two opposite side edges of the main body 62. The box body 20 comprises a bottom board 22 and side boards 24 perpendicular to the bottom board 22. The bottom board 22 and the side boards 24 define a receiving space 240. The glass panels 40 and the cushioning separator plates 60 are alternately stacked in the receiving space 240. The side boards 24 are provided with receiving slots 26 that correspond to the lugs 64.

Figure 8:
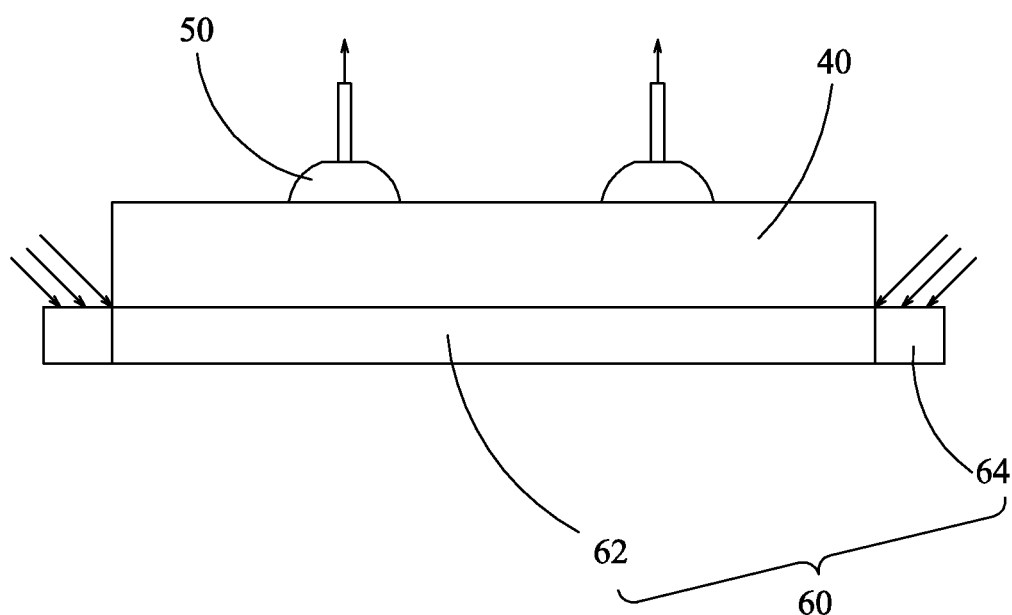
FIG. 8 is a schematic view illustrating de-packaging by applying the method for de-packaging a glass panel packaging box according to the first embodiment of the present invention.
Figure 9:
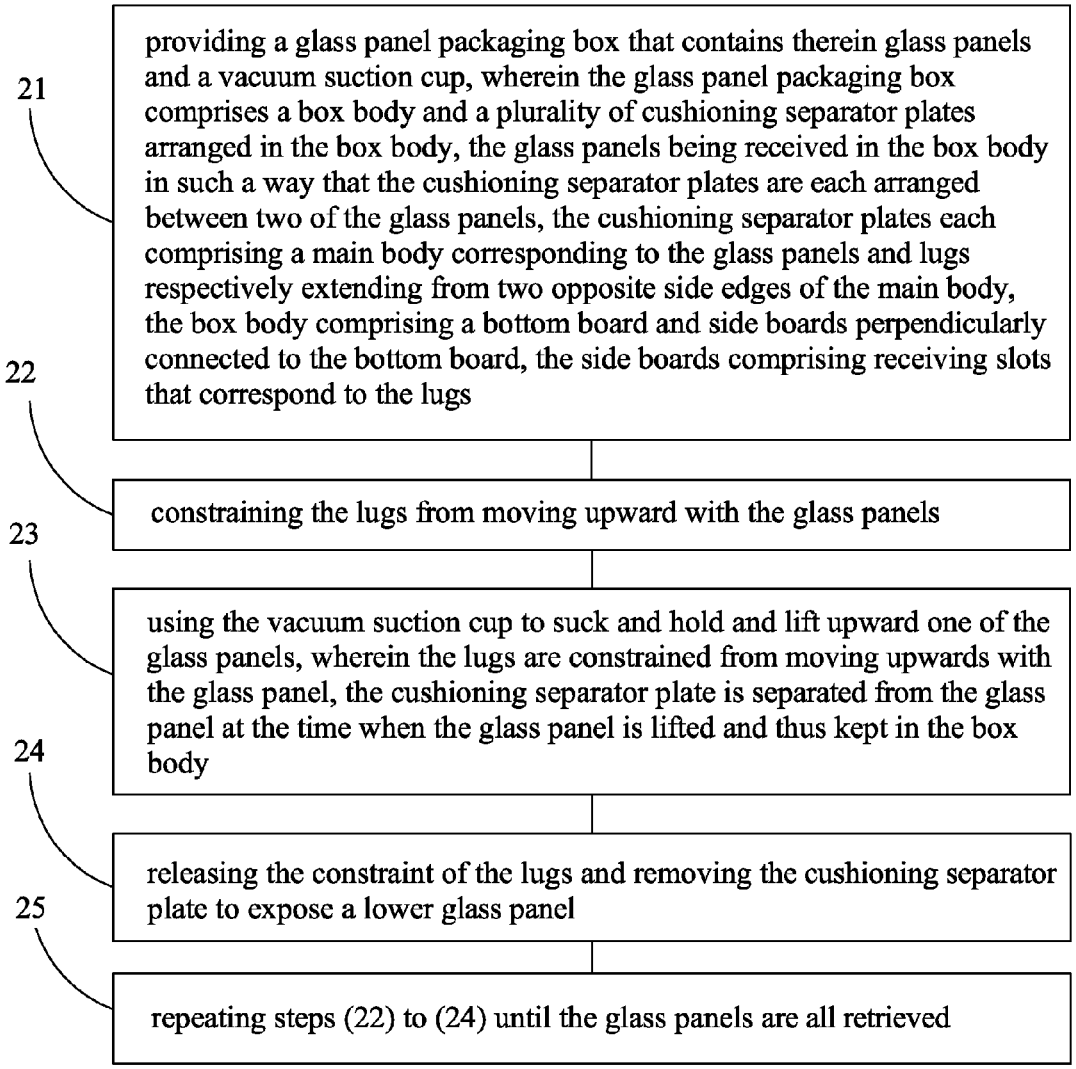
FIG. 9 is a flow chart illustrating a method for de-packaging a glass panel packaging box according to a second embodiment of the present invention.

In the instant embodiment, the main body 62 is made in the form of a rectangle. The lugs 64 are provided at two opposite side edges of the main body 62. To de-package (as shown in FIG. 8), vacuum suction cups 50 are used to suck and hold a glass panel 40 and applying an upward lifting force (vertical arrows of FIG. 8) to the glass panel 40. At the same time, ionic fans (not shown) are used to blow downward inclined ionic airflows (downward inclined arrows of FIG. 8) to contact areas between the glass panels 40 and the lugs 64 of the cushioning separator plate 60 to apply a downward force component to each of the lugs 64 of the cushioning separator plates 60. When the glass panel 40 gets separated from the lugs 64 of the cushioning separator plate 60, the ionic airflows blown from the ionic fans travel along the lugs 64 to get in between the glass panel 40 and the cushioning separator plate 60 so as to break the vacuum between the glass panel 40 and the cushioning separator plate 60, making the cushioning separator plate 60 to detach from the glass panel 40 under the action of gravity and the downward force components applied by the ionic airflows, whereby the problem that a lower-side glass panel 40 falls and gets broken due to the glass panel 40 and the cushioning separator plate 60 being vacuum-sucked and held can be avoided.

Figure 5:
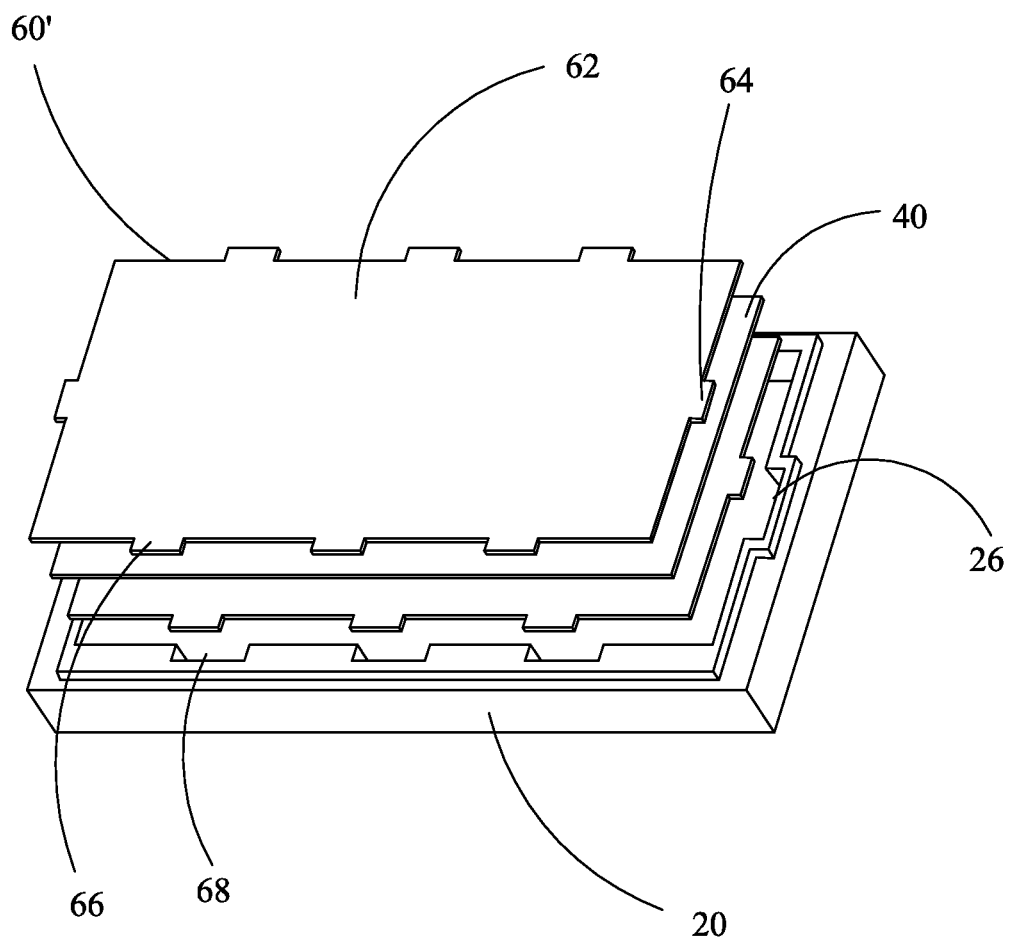
FIG. 5 is a schematic view showing a glass panel packaging box according to a second embodiment of the present invention.

Referring to FIG. 5, a schematic view of a glass panel packaging box according to a second embodiment of the present invention is shown. In the instant embodiment, the cushioning separator plates 60' further comprises projecting tabs 66 extending from another two opposite side edges of the main body 62. The side boards 24 of the box body 20 are provided with accommodation slots 68 that correspond to the projecting tabs 66. The projecting tabs and the lugs are of the same functionality.

Figure 6:
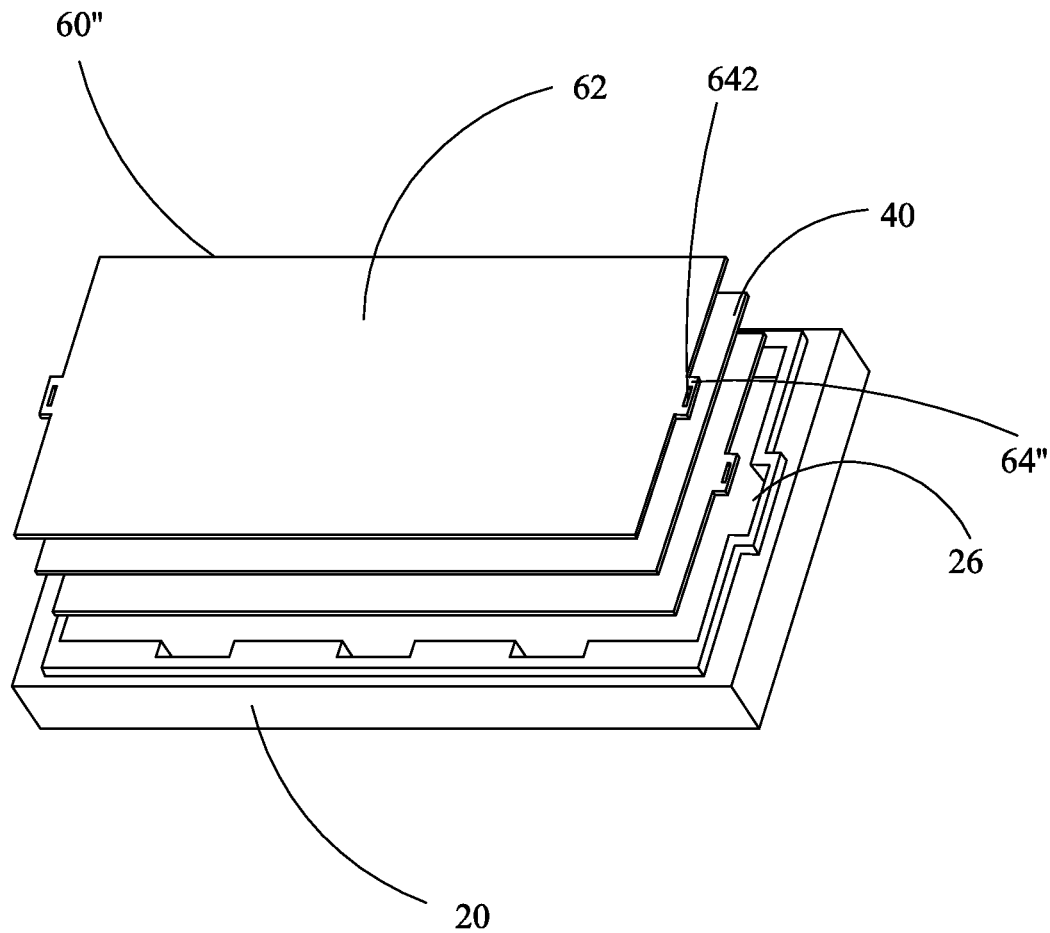
FIG. 6 is a schematic view showing a glass panel packaging box according to a third embodiment of the present invention.
Figure 10:
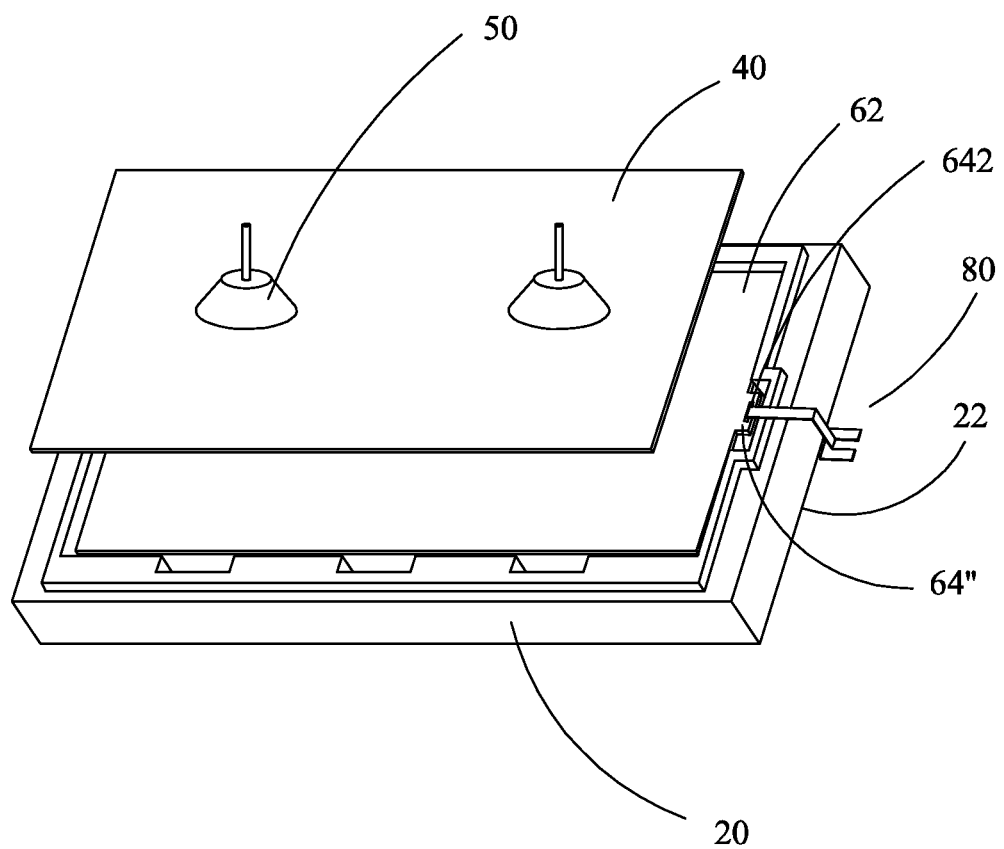
FIG. 10 is a schematic view illustrating de-packaging by applying the method for de-packaging a glass panel packaging box according to the second embodiment of the present invention.
Figure 11:
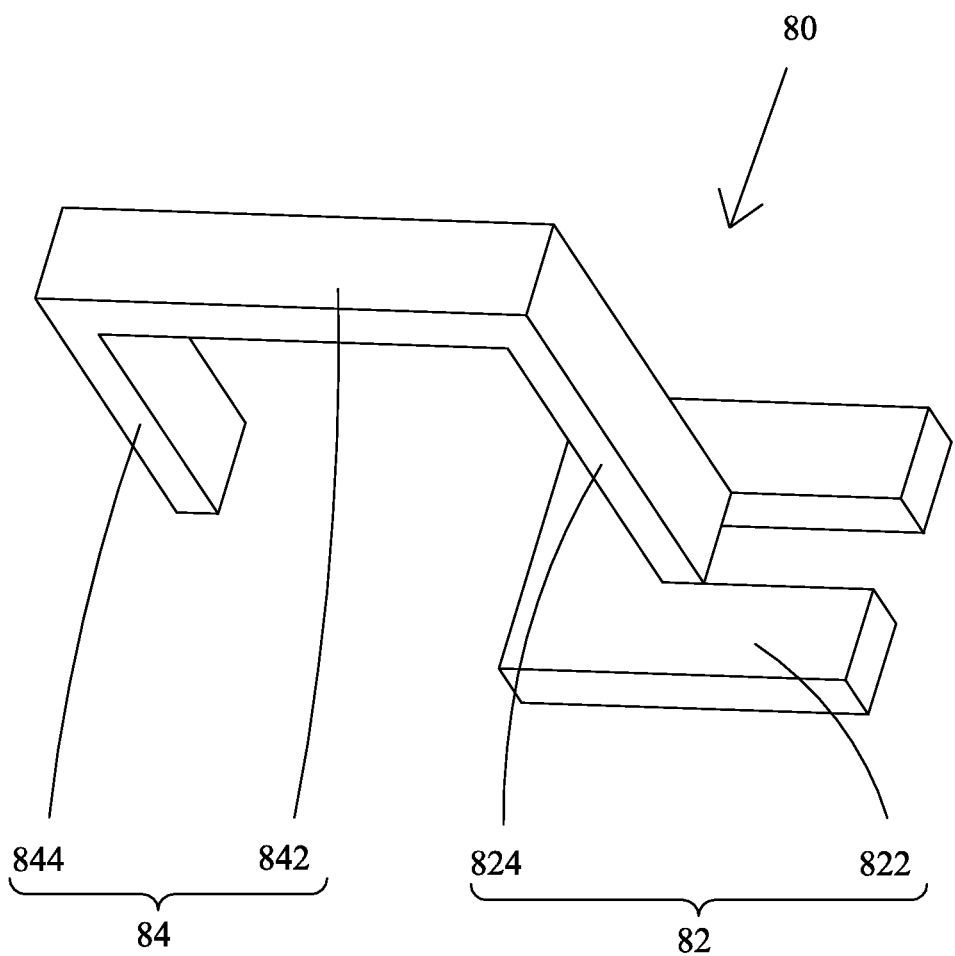
FIG. 11 is a schematic perspective view showing an ancillary clip of FIG. 10.

Referring to FIG. 6, a schematic view of a glass panel packaging box according to a third embodiment of the present invention is shown. In the instant embodiment, each lug 64" comprises an opening 642 formed therein. To de-package (see FIG. 10), a retention hook is used to constrain the cushioning separator plates 60" in the box body 20. In the instant embodiment, the retention hook comprises an ancillary clip 80. Specifically, as shown in FIG. 11, the ancillary clip 80 comprises a base section 82 and a hook section 84 connected to the base section 82. The base section 82 comprises a horizontal support portion 822 and a connection portion 824 extending upward from the support portion 822. The hook section 84 comprises a horizontal constraint portion 842 connected to the connection portion 824 and a positioning portion 844 connected to the constraint portion 842 and extending downward. The positioning portion 844 is insertable into the opening 642 of the lug 64". The constraint portion 842 functions to prevent the lug 64" from moving upward with a glass panel 40. The retention hook formed of the constraint portion 842 and the positioning portion 844 is mounted and fixed by means of the base section 82. Since the retention hook provided by the ancillary clip 80 help constrain the cushioning separator plate 60" in the box body 20, when the vacuum suction cups 50 lift a glass panels 40, the cushioning separator plate 60" will be separated from the glass panel 40 and retained in the box body 20. After the retrieval of the glass panel 40, the ancillary clip 80 is dismounted to release the constraint that the retention hook applies to the cushioning separator plate 60". After the cushioning separator plate 60" is removed, the ancillary clip 80 is re-mounted to constrain the next cushioning separator plate 60" from moving, and the next lower glass panel 40 can be retrieved.

It is noted that the specific structure the ancillary clip 80 can be modified according the type of the vacuum suction cups 50 used (manually operated or automatically operating) to make the de-packaging process carried out more smoothly.

Referring to FIGS. 4, 7, and 8, the present invention also provide a method for de-packaging a glass panel packaging box, which comprises the following steps:

Step 11: providing a glass panel packaging box that contains therein glass panels 40, suction cups 50, and ionic fans (not shown), wherein the glass panel packaging box that contains the glass panels 40 comprises a box body 20 and cushioning separator plates 60 arranged in the box body 20, the cushioning separator plates 60 being each arranged between two glass panels 40, the cushioning separator plates 60 each comprising a main body 62 corresponding to a glass panel 40 and lugs 64 respectively extending from two opposite side edges of the main body 62, the box body 20 comprising a bottom board 22 and side boards 24 perpendicular to the bottom board 22, the bottom board 22 and the side boards 24 defining a receiving space 240, the glass panels 40 and the cushioning separator plates 60 being sequentially stacked in the receiving space 240, the side boards 24 being provided with receiving slots 26 that correspond to the lugs 64.

Step 12: using the vacuum suction cups 50 to suck and hold and lift upward a glass panel 40.

The vacuum suction cups 50 can be manually operated suction cups or automatic mechanical suction cups, which sucks and holds and applies an upward lifting force (vertical arrows of FIG. 8) to the glass panel 40.

Step 13: using the ionic fans to blow airflows to contact areas between the glass panel 40 that is being retrieved and the lugs 64 of the cushioning separator plate 60 in order to break the vacuum between the glass panel 40 and the cushioning separator plate 60, whereby the cushioning separator plate 60 is acted upon by gravity and the ionic airflows to separate and retain in the box body 20.

Referring to FIG. 8, the ionic fans blow downward inclined ionic airflows (downward inclined arrows of FIG. 8) to the contact areas between the glass panel 40 and the lugs 64 of the cushioning separator plate 60 to apply a downward force component to each of the lugs 64 of the cushioning separator plate 60 to cause an initial separation at the contact areas between the glass panel 40 and the lugs 64 of the cushioning separator plate 60. At this moment, the downward inclined ionic airflows blown from the ionic fans travel along the lugs 64 to get in between the glass panel 40 and the cushioning separator plate 60 so as to break the vacuum between the glass panel 40 and the cushioning separator plate 60, making the cushioning separator plate 60 to detach from the glass panel 40 under the action of gravity and the downward force components applied by the ionic airflows, whereby the problem that a lower-side glass panel 40 falls and gets broken due to the glass panel 40 and the cushioning separator plate 60 being vacuum-sucked and held can be avoided.

When the vacuum suction cups 50 are automatic mechanical suction cups, the ionic fans can be mounted on the machine body of the vacuum suction cups 50.

Step 14: removing the cushioning separator plate 60 that is so separated and retained in the box body 20 in order to expose a lower one of the glass panels 40.

The cushioning separator plates 60 can be removed by using the vacuum suction cups 50. Preferably, the vacuum suction cups 50 are automatic mechanical suction cups.

Step 15: repeating Steps 12 to 14 until the glass panels 40 contained in the box body 20 are all retrieved.

Referring to FIGS. 6 and 9-11, the present invention further provides a method for de-packaging a glass panel packaging box, which comprises the following steps:

Step 21: providing a glass panel packaging box that contains therein glass panels 40 and vacuum suction cups 50, wherein the glass panel packaging box that contains the glass panels 40 comprises a box body 20 and cushioning separator plates 60" arranged in the box body 20, the cushioning separator plates 60" being each arranged between two glass panels 40, the cushioning separator plates 60" each comprising a main body 62 corresponding to a glass panel 40 and lugs 64" respectively extending from opposite side edges of the main body 62, the box body 20 comprising a bottom board 22 and side boards 24 perpendicular to the bottom board 22, the bottom board 22 and the side boards 24 defining a receiving space 240, the glass panels 40 and the cushioning separator plates 60" being sequentially stacked in the receiving space 240, the side boards 24 being provided with receiving slots 26 that correspond to the lugs 64".

Step 22: constraining the lugs 64" from moving upward with the glass panels 40.

Preferably, each of the lugs 64" comprises an opening 642 formed therein and a retention hook is used to constrain the cushioning separator plates 60" in the box body 20. In the instant embodiment, the retention hook comprises an ancillary clip 80. Specifically, as shown in FIG. 11, the ancillary clip 80 comprises a base section 82 and a hook section 84 connected to the base section 82. The base section 82 comprises a horizontal support portion 822 and a connection portion 824 extending upward from the support portion 822. The hook section 84 comprises a horizontal constraint portion 842 connected to the connection portion 824 and a positioning portion 844 connected to the constraint portion 842 and extending downward. The positioning portion 844 is insertable into the opening 642 of the lug 64". The constraint portion 842 functions to prevent the lug 64" from moving upward with a glass panel 40. The retention hook formed of the constraint portion 842 and the positioning portion 844 is mounted and fixed by means of the base section 82.

Step 23: using the vacuum suction cups 50 to suck and hold and lift upward a glass panel 40, wherein the lugs 64" are constrained from moving upwards with the glass panel 40, the cushioning separator plate 60" is separated from the glass panel 40 at the time when the glass panel 40 is lifted and thus kept in the box body 20.

Step 24: releasing the constraint of the lugs 64" and removing the cushioning separator plate 60" to expose a lower glass panel 40.

Specifically, after the glass panel 40 has been removed, the ancillary clip 80 is dismounted to release the constraint that the retention hook applies to the lugs 64" of the cushioning separator plate 60". And then, the vacuum suction cups 50 are used to remove the cushioning separator plate 60".

Step 25: repeating Steps 22 to 24 until the glass panels 40 are all retrieved.

Preferably, in the instant embodiment, there are ancillary clips 80, which are respectively engage and retain the lugs 64" on the two opposite side edges of the main body 62 of the cushioning separator plates 60". The specific structure the ancillary clip 80 can be modified according the type of the vacuum suction cups 50 used (manually operated or automatically operating) to make the de-packaging process carried out more smoothly.

It is noted that in Step 23, when the vacuum suction cups 50 suck and hold a glass panel 40 to lift upward, ionic fans may be used to blow airflows to the contact areas between the glass panel 40 and the lugs 64" of a cushioning separator plate 60" in order to break vacuum between the glass panel 40 and the cushioning separator plate 60" to facilitate the detachment and retention of the cushioning separator plate 60" in the box body 20.

In summary, the present invention provides a glass panel packaging box and a de-packaging method thereof, wherein lugs are provided on a cushioning separator plate and in de-packaging a glass panel packaging box, ionic fans are used to blow airflows from the locations of the lugs of the cushioning separator plate toward contact area between a glass panel and the cushioning separator plate in such a way that the airflows move in between the glass panel and the cushioning separator plate via the lugs to break vacuum between the glass panel and the cushioning separator plate to make separation of the cushioning separator plate and the glass panel easy so as to increase working efficiency and effectively reduces the occurrence of breaking of glass panels. Further, it is feasible to form an opening in each of the lugs to allow an ancillary clip to extend through the lugs to retain the cushioning separator plates in the box body for further improving the working efficiency, whereby the cushioning separator plates used with large-sized glass panels can be of a reduced thickness to reduce the weight of the packaging material, lower down the expense of the packaging material, and reduce the occurrence of breaking glass panel resulting from vacuum suction between the glass panels and the cushioning separator plates.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A glass panel packaging box, comprising: a box body and a cushioning separator plate arranged in the box body, the cushioning separator plate being adapted to be arranged between two glass panels, the cushioning separator plate comprising a main body corresponding in size and shape to the glass panels and lugs respectively extending from two opposite side edges of the main body and projecting beyond edges of the glass panels, the main body of the cushioning separator plate being interposed between the two glass panels in a manner of being laid flat between and having opposite surfaces completely and respectively in surface engagement with the glass panels, the box body comprising a bottom board and side boards perpendicularly connected to the bottom board, the side boards comprising receiving slots that correspond to the lugs.

2. The glass panel packaging box as claimed in claim 1, wherein each of the lugs comprises an opening formed therein.

3. The glass panel packaging box as claimed in claim 1, wherein the main body is in the form of a rectangle.

4. The glass panel packaging box as claimed in claim 3, wherein the cushioning separator plate further comprises projecting tabs extending from another two opposite side edges of the main body, the side boards comprising accommodation slots corresponding to the projecting tabs.

5. A method for de-packaging a glass panel packaging box, comprising the following steps:
 (1) providing a glass panel packaging box that contains therein glass panels and further providing a suction cup and a fan external to and separate from the glass panel packaging box, wherein the glass panel packaging box comprises a box body and a plurality of cushioning separator plates arranged in the box body, the glass panels being received in the box body in such a way that the cushioning separator plates are each arranged between two adjacent ones of the glass panels, the cushioning separator plates each comprising a main body corresponding in size and shape to the glass panels and lugs respectively extending from two opposite side edges of the main body and projecting beyond edges of the glass panels, the main body of the cushioning separator plate being interposed between the two adjacent ones of the glass panels in a manner of being laid flat between and having opposite surfaces completely and respectively in surface engagement with the two adjacent glass panels, the box body comprising a bottom board and side boards perpendicularly connected to the bottom board, the side boards comprising receiving slots that correspond to the lugs;
 (2) using the suction cup to suck and hold and lift upward one of the glass panels;
 (3) using the fan to blow airflows to contact areas between the glass panel that is being retrieved and the lugs of the cushioning separator plate in surface engagement with the glass panel that is being retrieved in order to break vacuum between the glass panel and the cushioning separator plate to allow the cushioning separator plate to separate from the glass panel that is being retrieved and retain in the box body;
 (4) removing the cushioning separator plate that is so separated and retained in the box body in order to expose a lower one of the glass panels; and
 (5) repeating steps (2) to (4) until the glass panels contained in the box body are all retrieved.

6. The method for de-packaging a glass panel packaging box as claimed in claim 5, wherein the fan comprises an ionic fan and in step (4), a suction cup is used to remove the cushioning separator plate, the suction cup being a vacuum suction cup.

7. A method for de-packaging a glass panel packaging box, comprising the following steps:
 (1) providing a glass panel packaging box that contains therein glass panels and further providing a suction cup external to and separate from the glass panel packaging box, wherein the glass panel packaging box comprises a box body and a plurality of cushioning separator plates arranged in the box body, the glass panels being received in the box body in such a way that the cushioning separator plates are each arranged between two adjacent ones of the glass panels, the cushioning separator plates each comprising a main body corresponding in size and shape to the glass panels and lugs respectively extending from two opposite side edges of the main body and projecting beyond edges of the glass panels, the main body of the cushioning separator plate being interposed between the two adjacent ones of the glass panels in a manner of being laid flat between and having opposite surfaces completely and respectively in surface engagement with the two adjacent glass panels, the box body comprising a bottom board and side boards perpendicularly connected to the bottom board, the side boards comprising receiving slots that correspond to the lugs;
 (2) constraining the lugs from moving upward with the glass panels;
 (3) using the suction cup to suck and hold and lift upward one of the glass panels, wherein the lugs are constrained from moving upwards with the glass panel, and the cushioning separator plate is separated from the glass panel at the time when the glass panel is lifted so as to have the cushioning separator plate kept in the box body;
 (4) releasing the constraint of the lugs and removing the cushioning separator plate to expose a lower glass panel; and
 (5) repeating steps (2) to (4) until the glass panels are all retrieved.

8. The method for de-packaging a glass panel packaging box as claimed in claim 7, wherein in step (1), each of the lugs comprises an opening formed therein; in step (2), a retention hook is inserted through the opening to retain the lug so as to constrain the lug from moving upward with the glass panel; and in step (3), the retention hook is moved to release the constraint of the lug.

9. The method for de-packaging a glass panel packaging box as claimed in claim 8, wherein in step (2), the retention hook comprises an ancillary clip, the ancillary clip comprising a base section and a hook section connected to the base section, the base section comprising a horizontal support portion and a connection portion extending upward from the support portion, the hook section comprising a horizontal constraint portion connected to the connection portion and a positioning portion connected to the constraint portion and extending downward, the positioning portion being insertable into the opening of the lug, the constraint portion functioning to prevent the lug from moving upward with the glass panel, the retention hook that is formed of the constraint portion and the positioning portion being mounted and fixed by means of the base section.

10. The method for de-packaging a glass panel packaging box as claimed in claim 7, wherein step (3) further comprises using a fan to blow airflows to contact areas between the glass panel that is being retrieved and the lugs of the cushioning separator plate in order to break vacuum between the glass panel and the cushioning separator plate to allow the cushioning separator plate to separate and retain in the box body.

* * * * *